US012681294B2

(12) United States Patent
Hatazaki et al.

(10) Patent No.: US 12,681,294 B2
(45) Date of Patent: Jul. 14, 2026

(54) PROJECTION APPARATUS

(71) Applicants: Soya Hatazaki, Kanagawa (JP); Naoto Nakamura, Kanagawa (JP); Hiroyuki Satoh, Kanagawa (JP); Yukio Kozaki, Kanagawa (JP)

(72) Inventors: Soya Hatazaki, Kanagawa (JP); Naoto Nakamura, Kanagawa (JP); Hiroyuki Satoh, Kanagawa (JP); Yukio Kozaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 322 days.

(21) Appl. No.: 18/510,643

(22) Filed: Nov. 16, 2023

(65) Prior Publication Data

US 2024/0176131 A1 May 30, 2024

(30) Foreign Application Priority Data

Nov. 24, 2022 (JP) ................................. 2022-187315

(51) Int. Cl.
G02B 26/08 (2006.01)
G02B 26/10 (2006.01)
(52) U.S. Cl.
CPC ....... G02B 26/101 (2013.01); G02B 26/0833 (2013.01)
(58) Field of Classification Search
CPC ............. G02B 26/101; G02B 26/0833; G02B 26/123; G02B 26/105
See application file for complete search history.

(56) References Cited

U.S. PATENT DOCUMENTS

| | | | |
|---|---|---|---|
| 5,657,146 A | 8/1997 | Choi et al. | |
| 5,680,244 A | 10/1997 | Ono et al. | |
| 5,815,301 A | 9/1998 | Naiki et al. | |

(Continued)

FOREIGN PATENT DOCUMENTS

| | | |
|---|---|---|
| EP | 1 788 421 A1 | 5/2007 |
| JP | 2005-202221 A | 7/2005 |
| JP | 2007-025191 A | 2/2007 |

OTHER PUBLICATIONS

Extended European Search Report issued Mar. 15, 2024 in European Patent Application No. 23202268.1, 8 pages.

*Primary Examiner* — Euncha P Cherry
(74) *Attorney, Agent, or Firm* — XSENSUS LLP

(57) ABSTRACT

A projection apparatus includes: multiple scanning optical systems each including: a light source to emit a light beam; a scanner to deflect the light beam from the light source to form a scanning light beam; a magnifier including: at least one positive lens; and at least one negative lens, to magnify a scanning angle of the scanning light beam from the scanner; and a board having: a mounting surface; and a perpendicular line perpendicular to the mounting surface, the board mounting multiple scanners including the scanner of the multiple scanning optical systems on the mounting surface. Multiple scanning light beams have the scanning light beam from the scanner are arranged in rotational symmetry with respect to the perpendicular line with different angles in a plane of the mounting surface of the board, and the multiple scanning optical systems project the multiple scanning light beams to different regions from each other.

20 Claims, 17 Drawing Sheets

(56)     References Cited

U.S. PATENT DOCUMENTS

| 7,697,180 | B2 * | 4/2010 | Nakajima | G02B 26/127 |
| | | | | 359/213.1 |
| 8,593,701 | B2 * | 11/2013 | Soeda | G02B 26/105 |
| | | | | 359/204.3 |
| 2005/0024482 | A1 * | 2/2005 | Yonekubo | G02B 26/105 |
| | | | | 347/225 |
| 2022/0091235 | A1 * | 3/2022 | Lu | G02B 26/085 |
| 2023/0298345 | A1 | 9/2023 | Satoh et al. | |
| 2023/0300290 | A1 | 9/2023 | Nakamura et al. | |
| 2023/0300314 | A1 | 9/2023 | Shimizu et al. | |

\* cited by examiner

FIG. 1

INDUCING VISUAL FIELD

STABLE
VISUAL FIELD

EFFECTIVE
VISUAL FIELD

OBSERVER

STABLE
VISUAL FIELD

INDUCING VISUAL FIELD

A

C

90

IP´

0

B

-90

-90          0          90

D

ANGLE [DEGREE]

ANGLE [DEGREE]

PROJECTION APPARATUS

CROSS-REFERENCE TO RELATED APPLICATION

This patent application is based on and claims priority pursuant to 35 U.S.C. § 119(a) to Japanese Patent Application No. 2022-187315, filed on Nov. 24, 2022, in the Japan Patent Office, the entire disclosure of which is hereby incorporated by reference herein.

BACKGROUND

Technical Field

Embodiments of the present disclosure relate to a projection apparatus.

Related Art

For example, there is a laser scanning projection apparatus incorporated in a wearable device, which scans an object in two-dimensional directions with a laser beam modulated based on an image signal.

SUMMARY

According to an embodiment of the present disclosure, a projection apparatus includes: multiple scanning optical systems each including: a light source to emit a light beam; a scanner to deflect the light beam from the light source to form a scanning light beam; a magnifier including: at least one positive lens; and at least one negative lens, to magnify a scanning angle of the scanning light beam from the scanner; and a board having: a mounting surface; and a perpendicular line perpendicular to the mounting surface, the board mounting multiple scanners including the scanner of the multiple scanning optical systems on the mounting surface. Multiple scanning light beams have the scanning light beam from the scanner are arranged in rotational symmetry with respect to the perpendicular line with different angles in a plane of the mounting surface of the board, and the multiple scanning optical systems project the multiple scanning light beams to different regions from each other.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a schematic diagram of a wearable device according to one embodiment of the present disclosure:

FIG. 11 is a diagram illustrating an arrangement example of a scanning optical system provided with a projection apparatus according to the second modification of an embodiment of the present disclosure:

FIG. 13 is a perspective view of a projection apparatus according to a third modification of an embodiment of the present disclosure:

Figure 16:
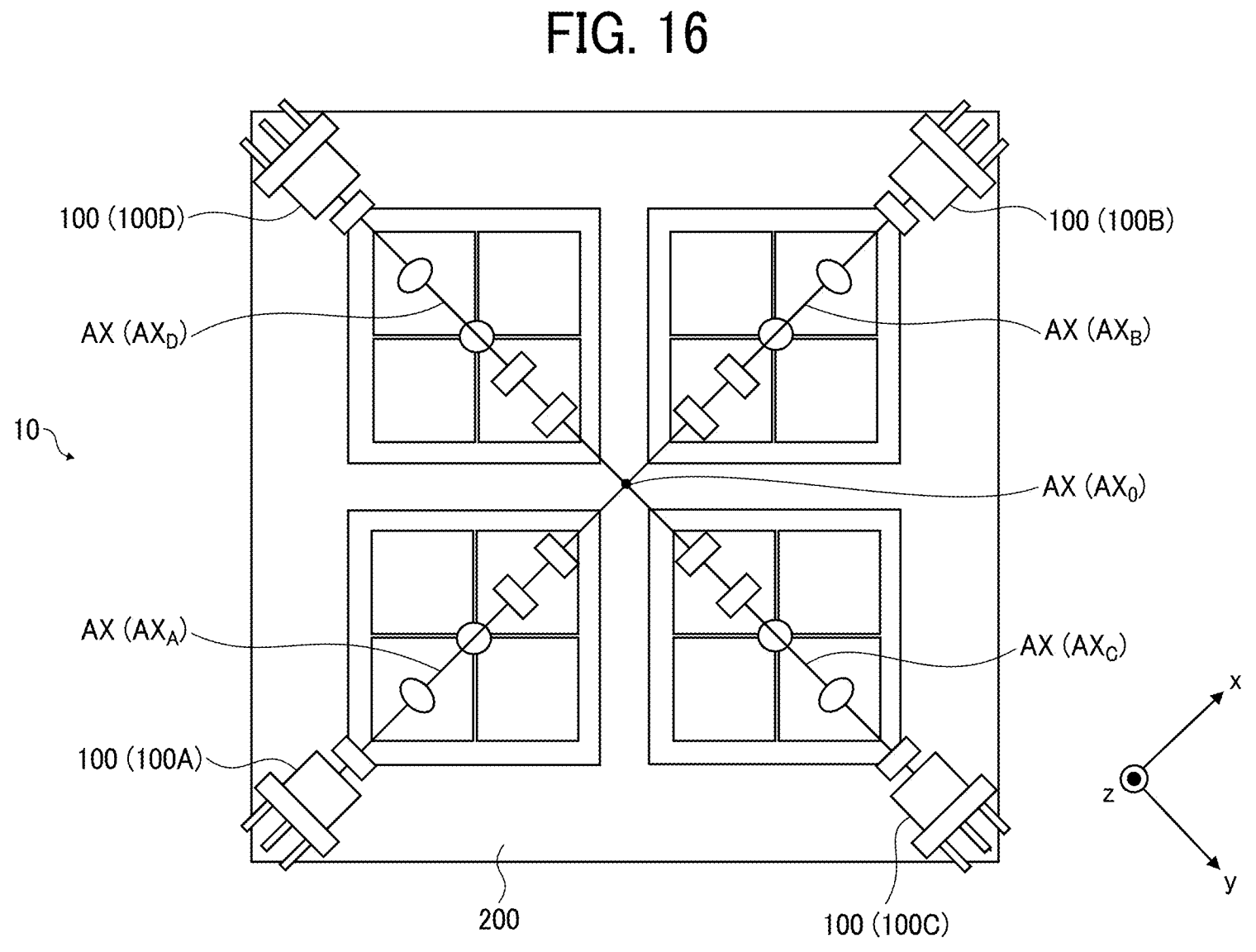

FIG. 16 is a top view of a projection apparatus according to one embodiment of the present disclosure.

DETAILED DESCRIPTION

Figure 2:
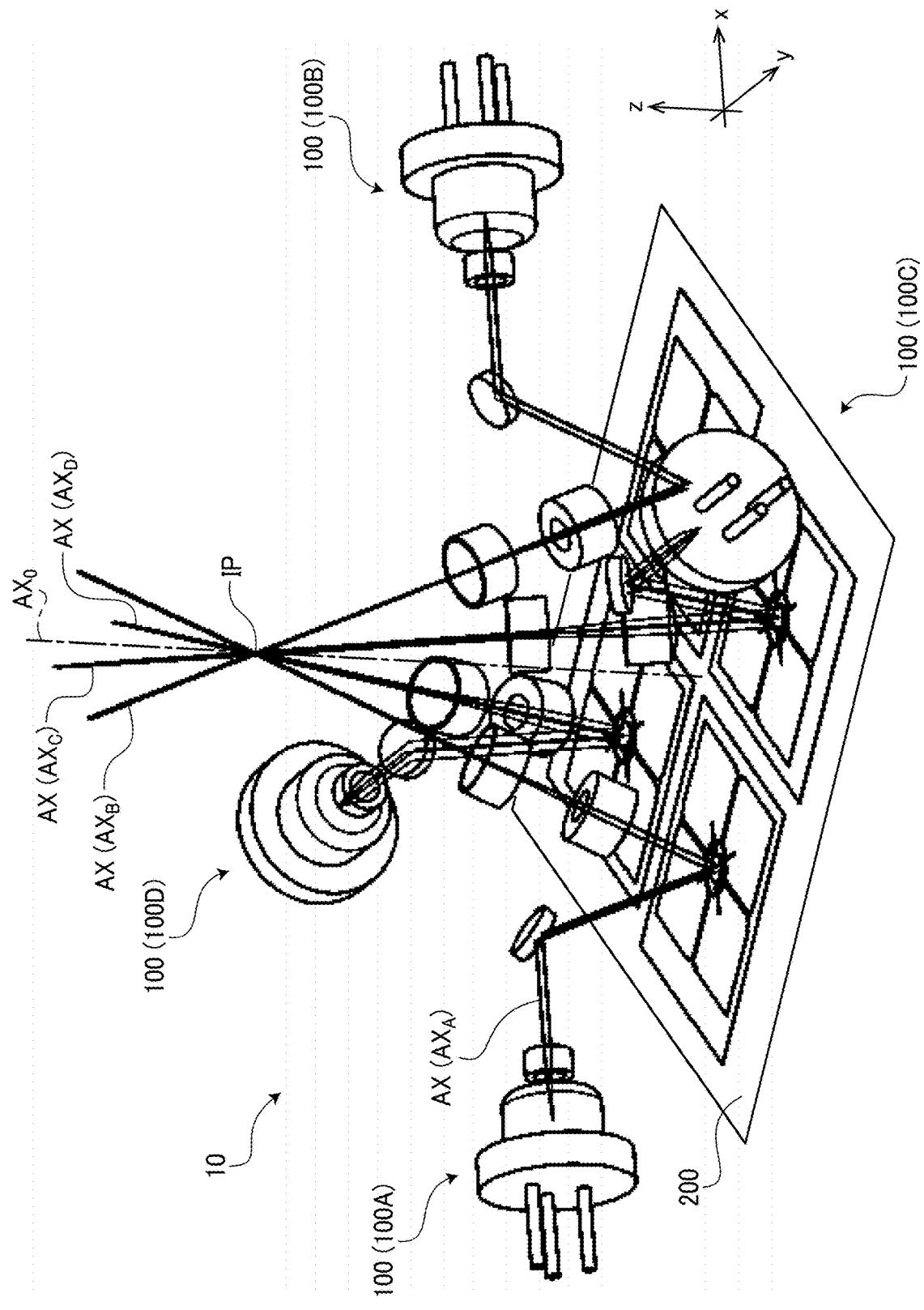
FIG. 2 is a perspective view of a projection apparatus according to one embodiment of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

According to an embodiment of the present disclosure, a projection apparatus that achieves a wide angle of view can be provided.

In the following description, a projection apparatus according to an embodiment of the present disclosure will be described with reference to the drawings. In the following description, like reference signs denote like elements, and redundant description is appropriately simplified or omitted.

Figure 1:
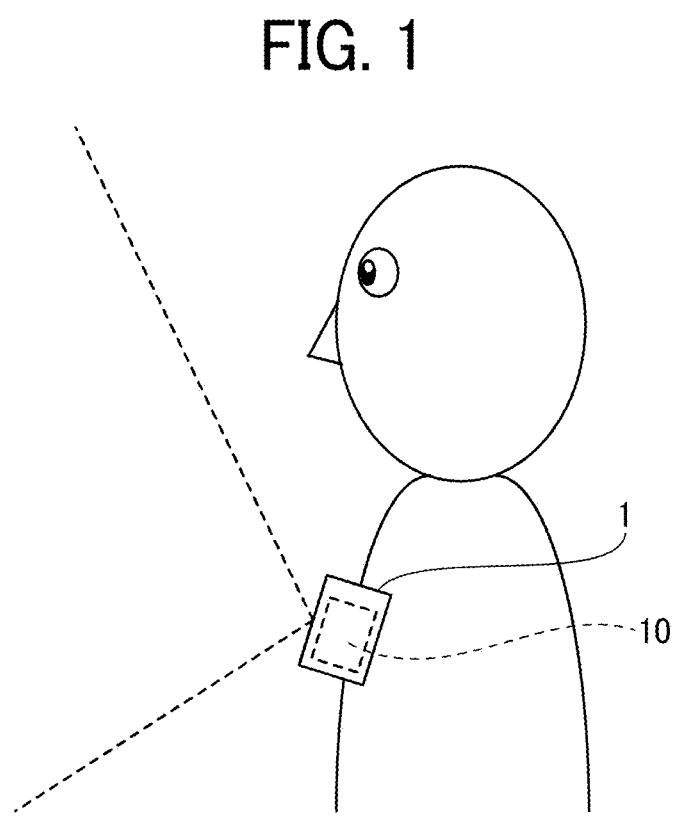

FIG. 1 is a schematic diagram of a wearable device 1 according to one embodiment of the present disclosure. The wearable device 1 is worn on the body of a worker for use. As an example, the wearable device 1 is attached to the worker's chest in a form of being fixed to a shoulder strap, or is hung from the worker's neck to the breast by using a neck strap.

As illustrated in FIG. 1, a projection apparatus 10 is incorporated in the wearable device 1. The projection apparatus 10 projects an image (e.g., a simple graphic for calling attention) on an object (e.g., a structure in a work site or a material placed in a work site) located in an area in which attention is distracted within a range of a visual field of a worker.

FIG. 2 is a perspective view of the projection apparatus 10 according to the present embodiment. As illustrated in FIG. 2, the projection apparatus 10 includes multiple scanning optical systems 100 (four scanning optical systems in the present embodiment) and a board 200.

When each of the scanning optical systems 100 is distinguished from each other to describe, the four scanning optical systems 100 are represented by the scanning optical system 100A, the scanning optical system 100B, the scanning optical system 100C, and the scanning optical system 100D, respectively. When each of the optical axes AXs of the scanning optical systems 100 (i.e., 100A, 100B, 100C, and 100D) is distinguished from each other to describe, the optical axes AXs are represented by the optical axis $AX_A$, the optical axis $AX_B$, the optical axis $AX_C$, and the optical axis $AX_D$, respectively.

A line indicating the rotationally symmetric axis $AX_0$ includes a perpendicular line of the mounting surface of the board 200 according to the present embodiment. As illustrated in FIG. 2, in the scanning optical systems 100A to 100D, the optical axes $AX_A$ to $AX_D$ intersect on the rotationally symmetric axis $AX_0$ and are rotationally arranged with respect to the rotationally symmetric axis $AX_0$. The scanning optical systems 100A to 100D are arranged at equal intervals around the rotationally symmetric axis $AX_0$, for example. In other words, each of the scanning optical systems 100A to 100D is arranged at a position rotated by 90 degrees around the rotationally symmetric axis $AX_0$. An intersection point of the optical axes $AX_A$, $AX_B$, $AX_C$, and $AX_D$ is represented by the intersection point IP.

In at least some embodiments, in the projection apparatus, the multiple scanning optical systems are arranged around the perpendicular line at an equal interval.

The optical axis AX of the scanning optical system 100 is an axis passing through the center of each optical element of the scanning optical system 100.

In at least some embodiments, the projection apparatus, further includes multiple magnifiers including the magnifier. The multiple magnifiers respectively have multiple optical axes each intersecting the perpendicular line.

In the following description, a direction in which the rotationally symmetric axis $AX_0$ extends is defined as a z-axis direction, and two directions orthogonal to the z-axis direction and orthogonal to each other are defined as an x-axis direction and a y-axis direction, respectively.

Examples of the rotationally symmetrical axis $AX_0$ include the perpendicular line. The x-axis direction, the y-axis direction and the z-axis direction orthogonal to each other form a left-handed system.

An x-z plane including the x-axis and the z-axis includes the rotationally symmetric axis $AX_0$ and the optical axes $AX_A$ and $AX_B$. A y-z plane including the y-axis and the z-axis includes the rotationally symmetric axis $AX_0$, and the optical axes $AX_C$ and $AX_D$.

The scanning optical systems 100A to 100D are arranged so that each of the optical axes $AX_A$ to $AX_D$ form angles different from each other with respect to the rotationally symmetric axis $AX_0$ so that the scanning light is projected onto different regions of the object. By combining the partial images projected onto the different regions, one image is formed. In other words, since one image is projected onto a wide area that cannot be projected by the single scanning optical system 100, a wide angle of view can be achieved.

In at least some embodiments, a projection apparatus includes: multiple scanning optical systems each including: a light sources to emit a light beam; a scanner to deflect the light beam from the light source to form a scanning light beam; a magnifier including: at least one positive lens; and at least one negative lens, to magnify a scanning angle of the scanning light beam from the scanner; and a board having: a mounting surface; and a perpendicular line perpendicular to the mounting surface, the board mounting multiple scanners including the scanner of the multiple scanning optical systems on the mounting surface. Multiple scanning light beams have the scanning light beam from the scanner are arranged in rotational symmetry with respect to the perpendicular line with different angles in a plane of the mounting surface of the board, and the multiple scanning optical systems project the multiple scanning light beams to different regions from each other.

In at least some embodiments, in the projection apparatus, the multiple scanning optical systems respectively include multiple magnifiers including the magnifier, and the multiple scanning optical system are disposed in rotational symmetry with respect to the perpendicular line.

Additionally, each part of the scanning optical systems 100A to 100D is arranged so that the scanning optical systems 100A to 100D are arranged at an equal distance from the intersection point IP and each of the scanning light beams is a light beam directed toward the intersection point IP so that the scanning light beam is projected onto different areas of the object.

The one image includes, for example, at least one calling attention image that is projected onto an inattention area within the visual field of a worker.

Figure 3:
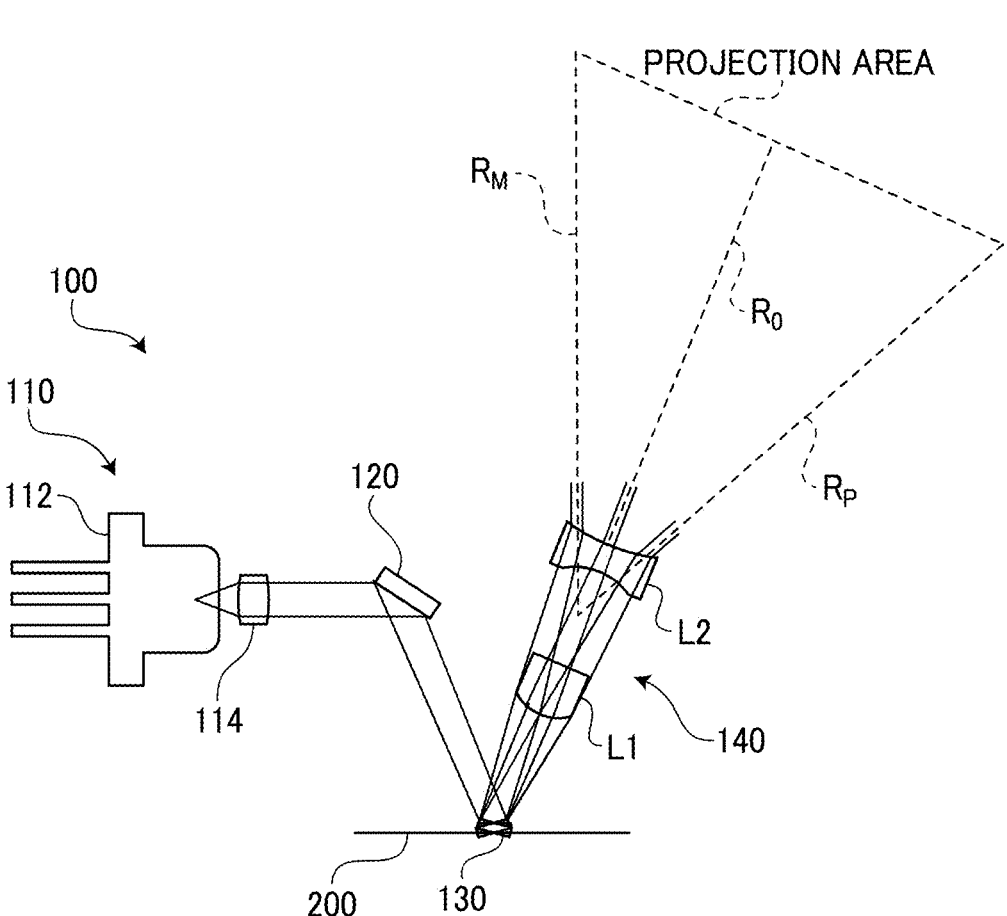
FIG. 3 is a diagram illustrating a scanning optical system provided with a projection apparatus according to one embodiment of the present disclosure.

FIG. 3 is a diagram of the scanning optical system 100 according to the present embodiment. As illustrated in FIG. 3, the scanning optical system 100 includes a light source 110, a mirror 120, a scanner 130, and a magnifier 140 (magnifying optical system).

The light source 110 includes a semiconductor laser 112 and a collimator lens 114. The light beam emitted from the semiconductor laser 112 is converted into a parallel light beam by the collimator lens 114.

The semiconductor laser 112 may be replaced by another type of light-emitting element, such as a light-emitting diode (LED).

The collimator lens 114 may convert the light beam incident from the semiconductor laser 112 into a gradually converging light beam instead of a parallel light beam. By designing the scanning optical system 100 so to handle both a parallel light beam and a gradually converging light beam with respect to the light beam emitted from the collimator lens 114, the position adjustment of the collimator lens 114 can be more facilitated.

In at least some embodiments, in the projection apparatus, the light beam incident on the scanner from the light source includes a parallel light beam or a converging light beam.

The mirror 120 is disposed on an optical path between the light source 110 and the scanner 130. The mirror 120 reflects the parallel light beam incident from the collimator lens 114 toward the scanner 130. In other words, the mirror 120 bends the optical path of the light beam from the light source 110 toward the scanner 130).

The scanner 130 is a device for deflecting the light beam from the light source 110 to scan, and is, for example, micro-electro-mechanical systems (MEMS) mirror. The scanner 130 is mounted on the board 200. The scanner 130 oscillates at a high speed in a range of +n degrees to reflect the parallel light beam or gradually converging light beam from the mirror 120 in a direction corresponding to the deflect angle. The deflection angle of the scanner 130 is, for example, +3.5 degrees.

The magnifier 140 is an optical system including at least one positive lens and at least one negative lens, and illustratively includes a positive lens L1 and a negative lens L2.

The magnifier 140 magnifies the scanning angle of the scanning light beam by the scanner 130. The magnifier 140 deflects, for example, the scanning light beam (deflection angle of +3.5 degrees) by the scanner 130 in a range of +22.5 degrees (i.e., 45 degrees at a full angle). In such a way, since the magnifier 140 magnifies the scanning angle, an image over a wide range that cannot be scanned by the scanner 130 alone can be projected.

In FIG. 3, the light beam $R_0$ is the light beam when the deflection angle of the scanner 130 is 0 degrees. The light beam $R_P$ is the light beam when the deflection angle of the scanner 130 is +22.5 degrees. The light beam $R_M$ is the light beam when the deflection angle of the scanner 130 is −22.5 degrees.

The mirror 120 is disposed at a position further away from the scanner 130 than the positive lens L1 in the z-axis direction in which the rotationally symmetric axis $AX_0$ extends. Examples of the rotationally symmetric axis $AX_0$ include the direction in which the perpendicular line extends. Examples of a lens located close to the scanner 130 in the magnifier 140 include the positive lens L1. More specifically, examples of a lens located closest to the scanner 130 in the magnifier 140 includes the positive lens L1. By disposing the mirror 120 as described above, elements of the scanning optical system 100 can be consolidated and disposed in a limited space. As a result, the size of the projection apparatus 10 can be reduced to increase the wearable property of the wearable device 1.

In at least some embodiments, in the projection apparatus, the scanning optical system includes: a mirror in an optical path between the light source and the scanner, and a lens adjacent to the scanner in the magnifier; the mirror bends the light beam from the light source toward the scanner, and the mirror is farther from the scanner than the lens in a direction extending the perpendicular line.

Further, by disposing the mirror 120 on the optical path between the light source 110 and the scanner 130, the degree of freedom in disposing the light source 110 is increased. For example, the light source 110 can be arranged in accordance with the overall shape of the projection apparatus 10. As a result, the size of the projection apparatus 10 is advantageously reduced.

Figure 4:
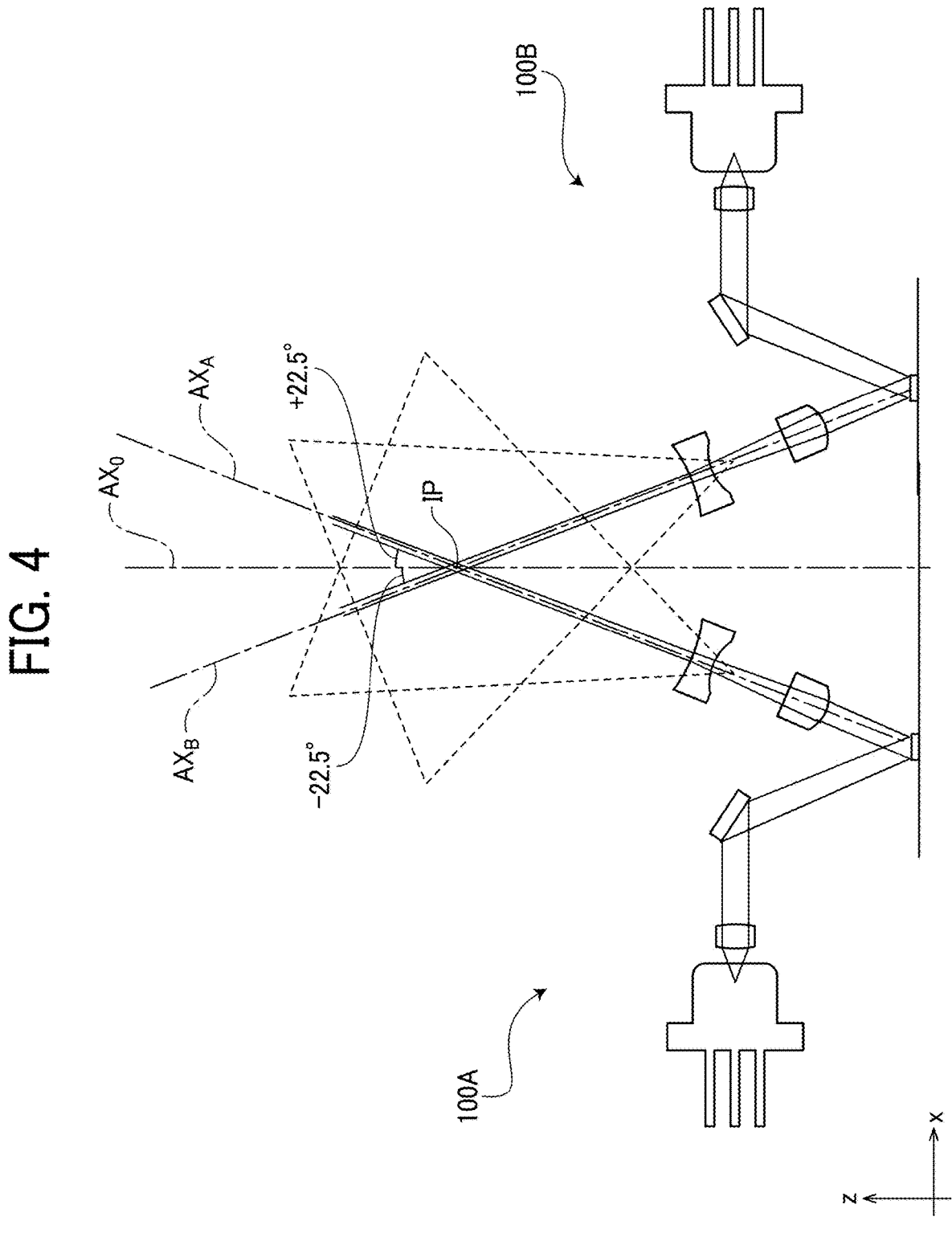
FIG. 4 is a diagram illustrating an arrangement example of a scanning optical system provided with a projection apparatus according to one embodiment of the present disclosure.

FIG. 4 is a diagram illustrating an arrangement example of the scanning optical system 100. In FIG. 4, a pair of scanning optical systems 100 (i.e., the scanning optical systems 100A and 100B) arranged opposite each other with respect to the rotationally symmetric axis $AX_0$ interposed between the pair of scanning optical systems 100. As illustrated in FIG. 4, the scanning optical systems 100A and 100B are disposed so that the optical axes $AX_A$ and $AX_B$ respectively form different angles with respect to the rotationally symmetric axis $AX_0$ on the x-z plane.

Figure 5:
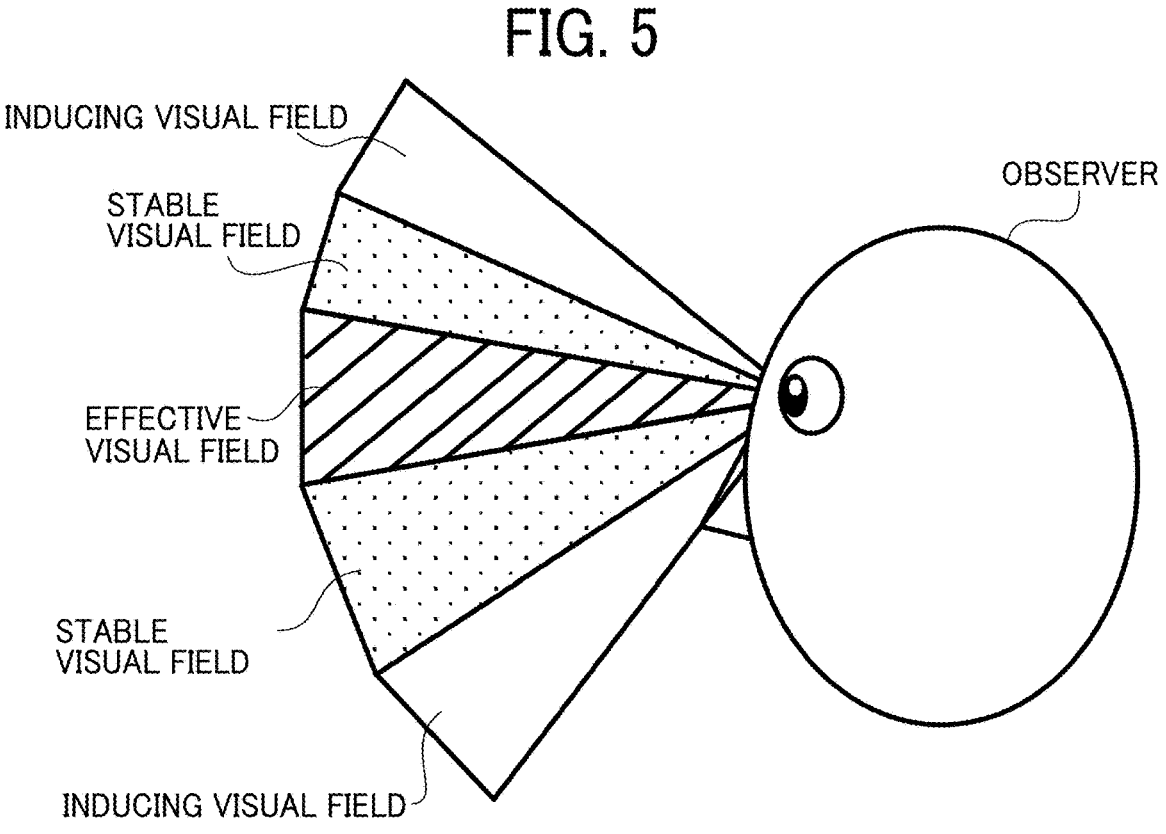
FIG. 5 is a diagram of the visual field of a human in visual observation with the naked eye.

FIG. 5 is a diagram of the visual field of a human in visual observation with the naked eye.

It is said that the visual field of a human (observer) under the condition of binocular observation is about 100 degrees from left to right (i.e., 200 degrees in total), 50 degrees upward, and 75 degrees downward (i.e., 125 degrees in total). Within this visual field, a visual field (stable visual field) that can be reasonably captured as visual information by head movement and eye movement is approximately 80 degrees from left to right and approximately 70 degrees from up to down. In addition, with respect to such a visual field of a human, the region in which the effect of presence at a wide viewing angle is saturated extends approximately 50 degrees leftward and approximately 50 degrees rightward (i.e., 100 degrees in total), which is almost equivalent to the stable visual field, and approximately 35 degrees upward and approximately 50 degrees downward (i.e., 85 degrees in total), that is, an inducing visual field.

As described above, although the visual field of a human is greatly expanded, the visual field that can be observed with the highest resolution is at most a region of the center of the visual field with a diameter of about 5 degrees (i.e., discrimination visual field). A visual field in which information can be instantly captured by only eye movement, that is, an effective visual field, extends a total of approximately 30 degrees horizontally and a total of approximately 20 degrees vertically.

For example, danger can be recognized within the range of the effective visual field by a human, and if there is an object to be aware of in the region outside the effective visual field, the object cannot be often aware of by a human. In consideration of such circumstances, the projection apparatus 10 according to the present embodiment has a configuration that can project an image for calling attention to an area above the stable visual field.

Figure 6:
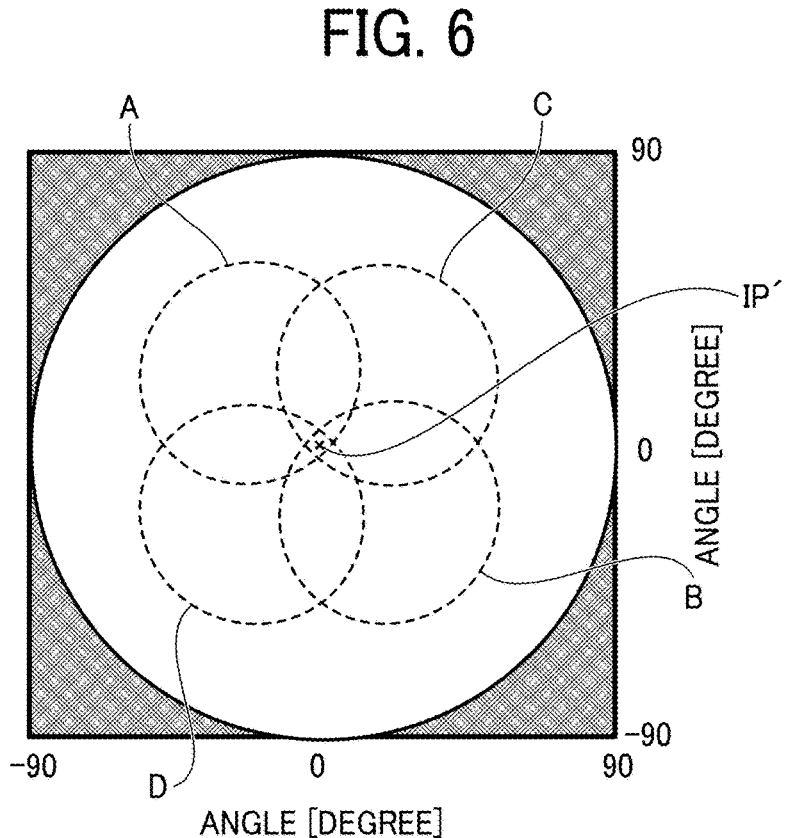
FIG. 6 is a schematic diagram illustrating the projection range of an image by a projection apparatus according to an embodiment of the present disclosure.

FIG. 6 is a schematic diagram illustrating the projection range of an image by the projection apparatus 10. In FIG. 6, a circle indicated by a broken line indicates a projection range of a partial image by each scanning optical system 100. A circle A indicates a projection range of a partial image by the scanning optical system 100A. A circle B indicates a projection range of a partial image by the scanning optical system 100B. A circle C indicates a projection range of a partial image by the scanning optical system 100C. A circle D indicates a projection range of a partial image by the scanning optical system 100D.

As illustrated in FIG. 6, the projection apparatus 10 uses the four scanning optical systems 100A to 100D to project four partial images onto regions different from each other to form one image. As a result, a wide angle of view is achieved. Additionally, the projection areas of the partial images have different projection centers. Further, the projection areas of the partial images may partially overlap each other.

As found from FIG. 6, a wide angle of view can be achieved by keeping no gap between the projection ranges of partial images projected by the scanning optical systems 100A to 100D and reducing the overlapping portion of the projection ranges to be small. The scanning optical system 100 projects an image in a range of 45 degrees at a full angle. In such a case, by changing the direction of each of the opposing optical systems by 45 degrees, there is no gap between the projection ranges of the partial images by the scanning optical systems 100, and the overlapping portion of the projection ranges is reduced to be small.

Thus, in order not to generate a gap between projection ranges of partial images by the respective scanning optical systems 100, the entire scanning angle (e.g., 45 degrees) of the scanning light beam that passes through the magnifier 140 is assigned to an angle that is twice or more than the angle (e.g., 22.5 degrees) between the optical axis AX and the rotationally symmetric axis $AX_0$.

As illustrated in FIG. 4, the scanning optical system 100A is arranged in a direction of −22.5 degrees with respect to the rotationally symmetric axis $AX_0$ in the x-z plane. The scanning optical system 100B is arranged in a direction of +22.5 degrees with respect to the rotationally symmetric axis $AX_0$ in the x-z plane. Similarly, the scanning optical system 100C is arranged in the y-z plane at an angle of +22.5 degrees with respect to the rotationally symmetric axis $AX_0$. The scanning optical system 100D is arranged in a direction of −22.5 degrees with respect to the rotationally symmetric axis $AX_0$ in the y-z plane.

As a result, the projection apparatus 10 according to the present embodiment can project an image onto an area larger than the effective visual field of a worker. As an example, the projection apparatus 10 can project an image in a range of 90 degrees at a full angle at the maximum and 70 degrees at a full angle at the minimum, that is, in a region above the stable visual field.

Additionally, in the present embodiment, since the scanning optical systems 100A to 100D are rotationally symmetrically arranged around the rotationally symmetric axis $AX_0$ and have a configuration in which the optical axes AX of the magnifiers 140 intersect one another on the rotationally symmetric axis $AX_0$ in the back parts of the magnifiers 140, the projection range of the partial image by each scanning optical system 100 is formed at a position around the intersection point IP' including the intersection point IP' (the intersection point between the object to be projected and the rotationally symmetric axis $AX_0$). Since the four circular projection areas overlap with each other at the position including the intersection point IP', the projection areas are arranged with no gap (or approximately no gap).

Figure 7:
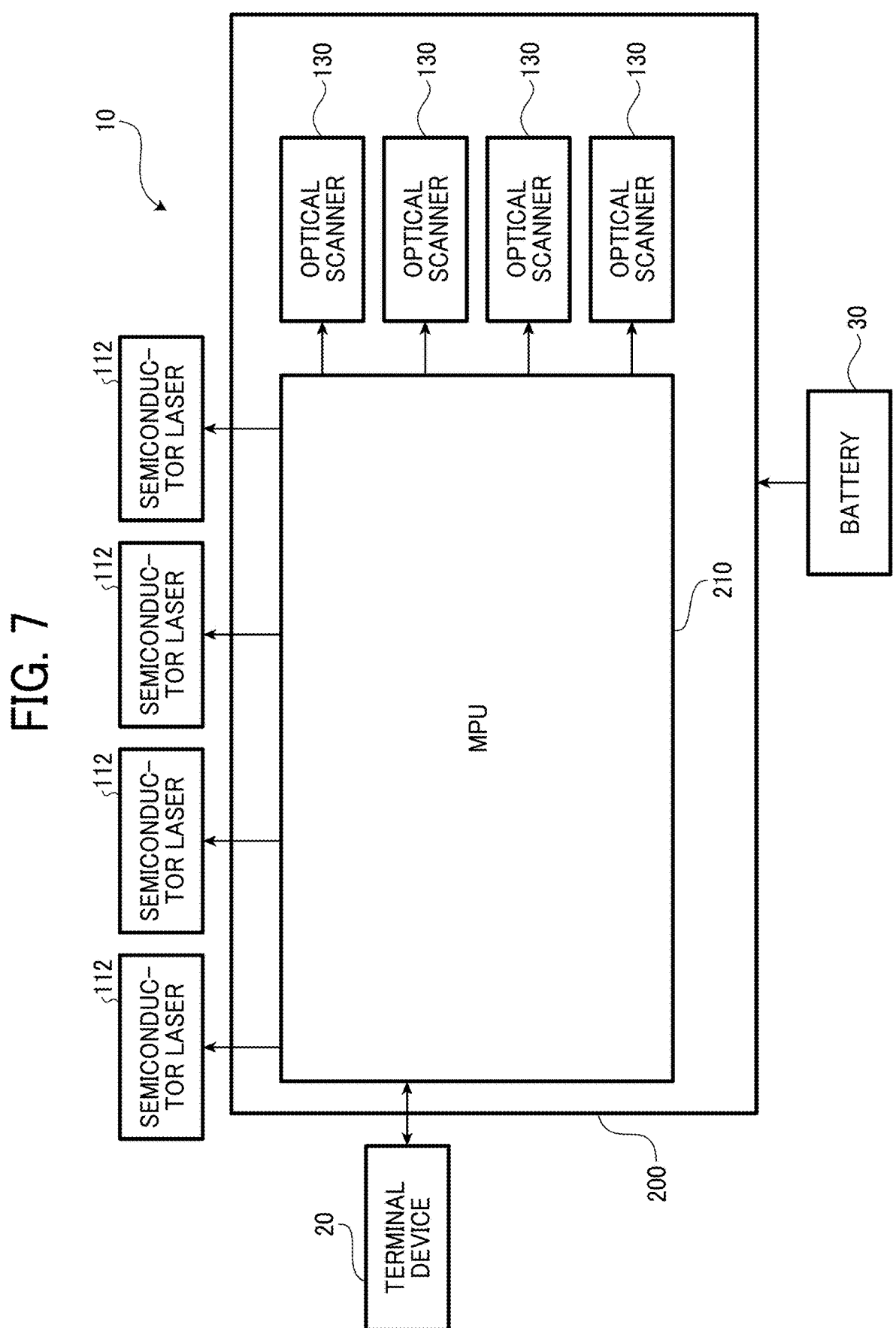
FIG. 7 is a block diagram illustrating a configuration of a projection apparatus according to one embodiment of the present disclosure.

FIG. 7 is a block diagram illustrating a configuration of a projection apparatus 10 according to an embodiment of the present disclosure. As illustrated in FIG. 7, a microprocessor unit (MPU) 210 is mounted on the board 200 in addition to the scanner 130 of each scanning optical system 100. The semiconductor laser 112, the scanner 130, and the MPU 210 are operated by power supplied from the battery 30.

The MPU 210 is connected to the terminal device 20 by, for example, wire or wireless. The terminal device 20 is, for example, a personal computer (PC), a tablet terminal, or a smartphone.

The MPU 210 receives projection image data from the terminal device 20. The MPU 210 converts the received projection image data into a drive control signal for the semiconductor laser 112 and a drive control signal for the scanner 130, and outputs these drive control signals to the semiconductor laser 112 and the scanner 130 of each scanning optical system 100. Each scanning optical system 100 (i.e., the semiconductor laser 112 and the scanner 130) operates independently according to a partial image to be projected based on an input drive control signal. By combining partial images obtained by the scanning optical systems 100, one image with a wide angle of view is projected onto an object.

The scanning method by the scanner 130 may be vector scanning or raster scanning. In the case of the vector scanning, for example, a simple graphic can be projected with high brightness. In the case of the raster scanning, a low-luminance image can be projected over a wide area. In the case of calling attention at a work site, for example, the vector scanning may be employed giving priority to luminance.

In the present embodiment, since the multiple scanning optical systems 100 are rotationally symmetrically arranged with respect to the rotationally symmetric axis $AX_0$, the scanners 130 of the scanning optical systems 100 are concentrated on and disposed in the vicinity of the rotationally symmetric axis $AX_0$. Thus, the scanner 130 of each scanning optical system 100 can be mounted on the board 200 which is a single control board, and the size of the projection apparatus 10 can be reduced.

Figure 8:
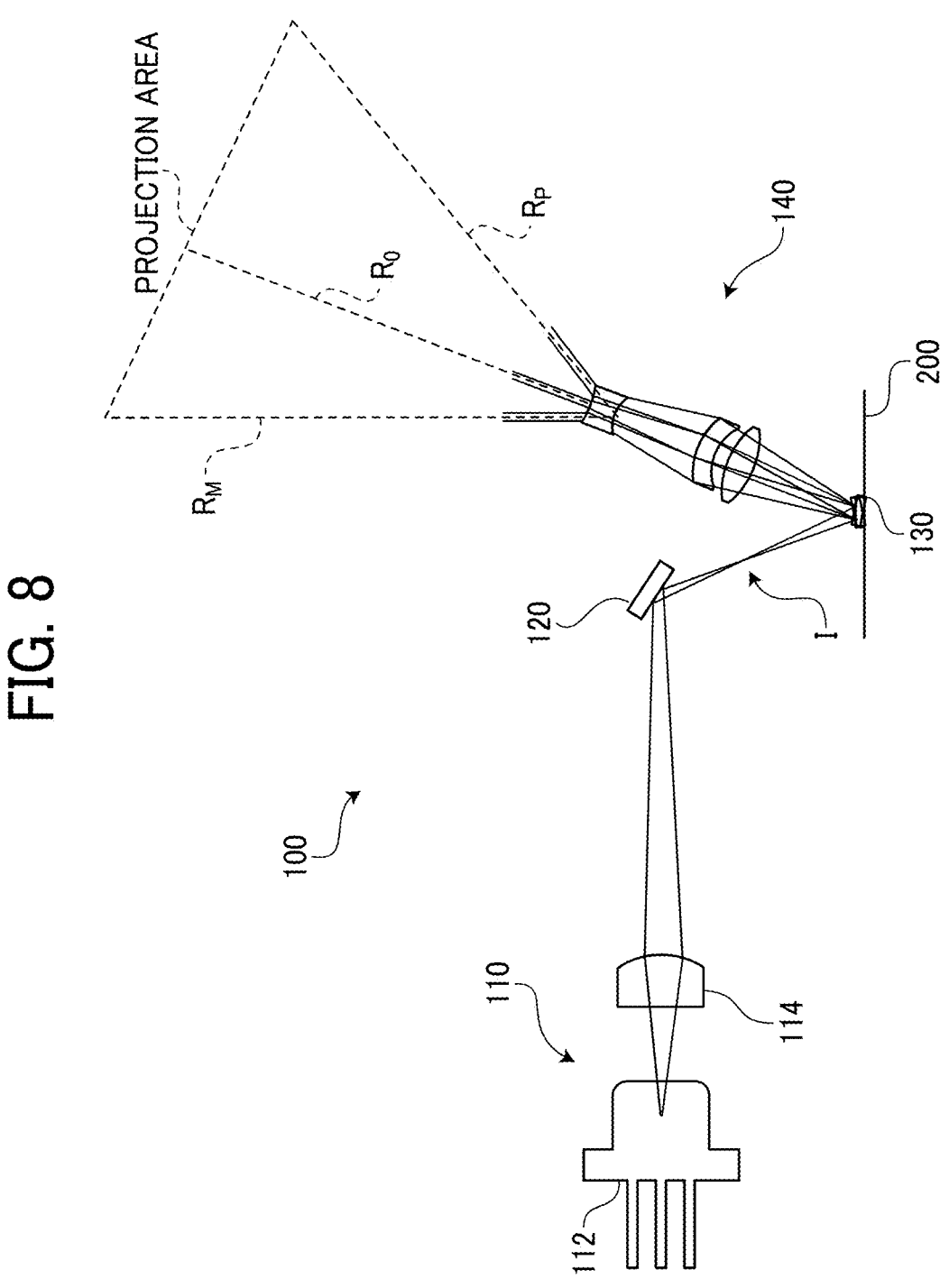
FIG. 8 is a diagram illustrating a scanning optical system provided with a projection apparatus according to a first modification of an embodiment of the present disclosure.
Figure 9:
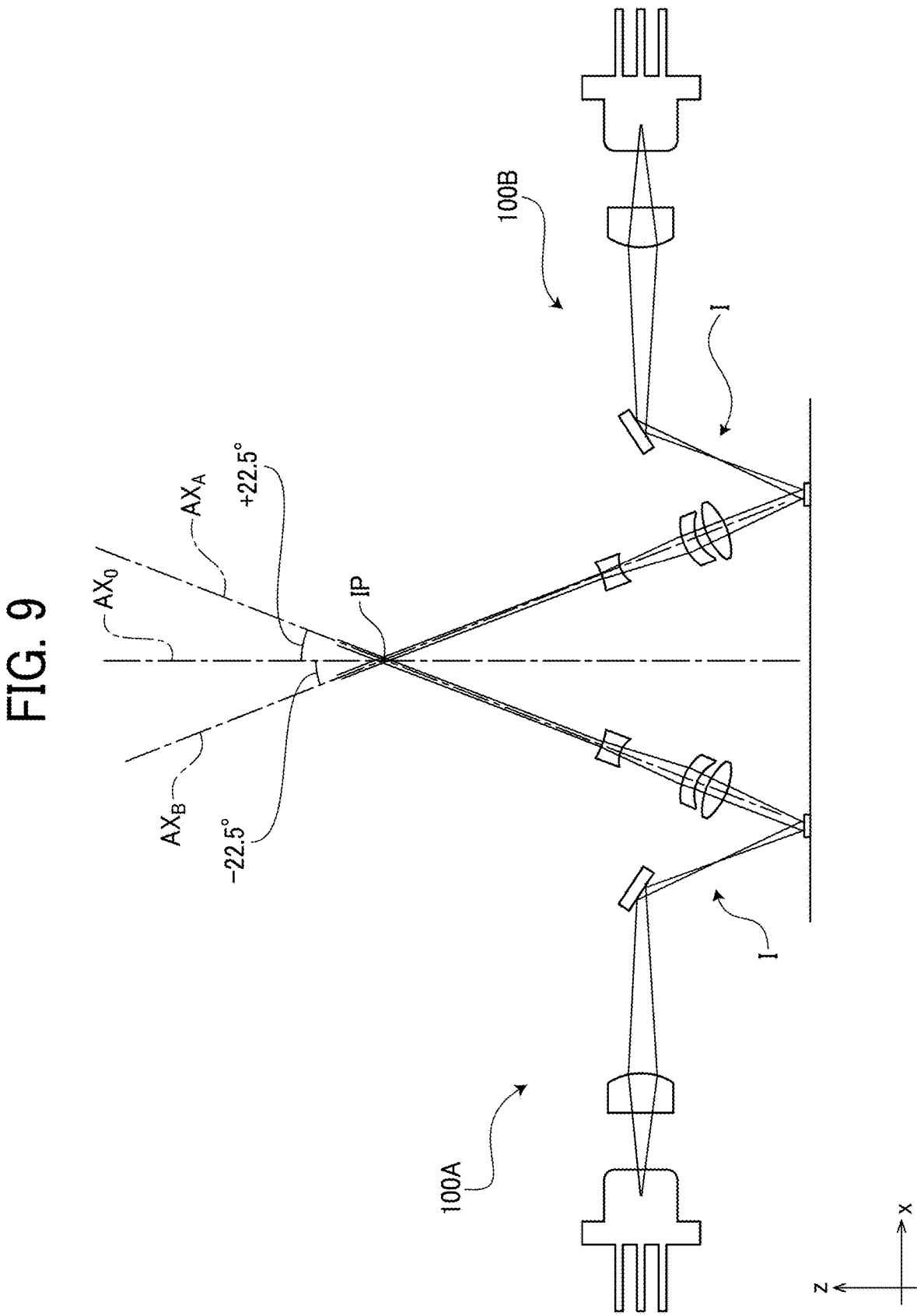
FIG. 9 is a diagram illustrating an arrangement example of a scanning optical system provided with a projection apparatus according to the first modification of an embodiment of the present disclosure.

FIG. 8 is a diagram illustrating a scanning optical system 100 according to a first modification of the above-described embodiments of the present disclosure. FIG. 9 is a diagram illustrating an arrangement example of the scanning optical system 100 according to the first modification of the above-described embodiments of the present disclosure. The scanning optical system 100 according to the first modification has the same configuration as that of the scanning optical system 100 according to the above-described embodiments of the present disclosure described above except that an intermediate image I is formed on the optical path.

In the first modification, the collimator lens 114 converges the light beam incident from the semiconductor laser 112 to form an intermediate image I on the optical path between the mirror 120 and the scanner 130. As described above, the collimator lens 114 forms the intermediate image I on the optical path between the light source 110 and the scanner 130. Examples of the intermediate image former include the collimator lens 114.

In at least some embodiments, in the projection apparatus, the scanning optical system includes an intermediate image former in an optical path between the light source and the scanner to form an intermediate image.

It is preferable that the power of the magnifier 140 be closer to zero. Thus, it is preferable that the distance between the intermediate image I and the magnifier 140 on the optical path be larger. In the first modification, the intermediate image I is formed on the optical path closer to the light source 110 than to the scanner 130.

By adopting a configuration in which the intermediate image I is formed on the optical path between the light source 110 and the scanner 130, the position adjustment of the collimator lens 114 can be further facilitated.

Figure 10:
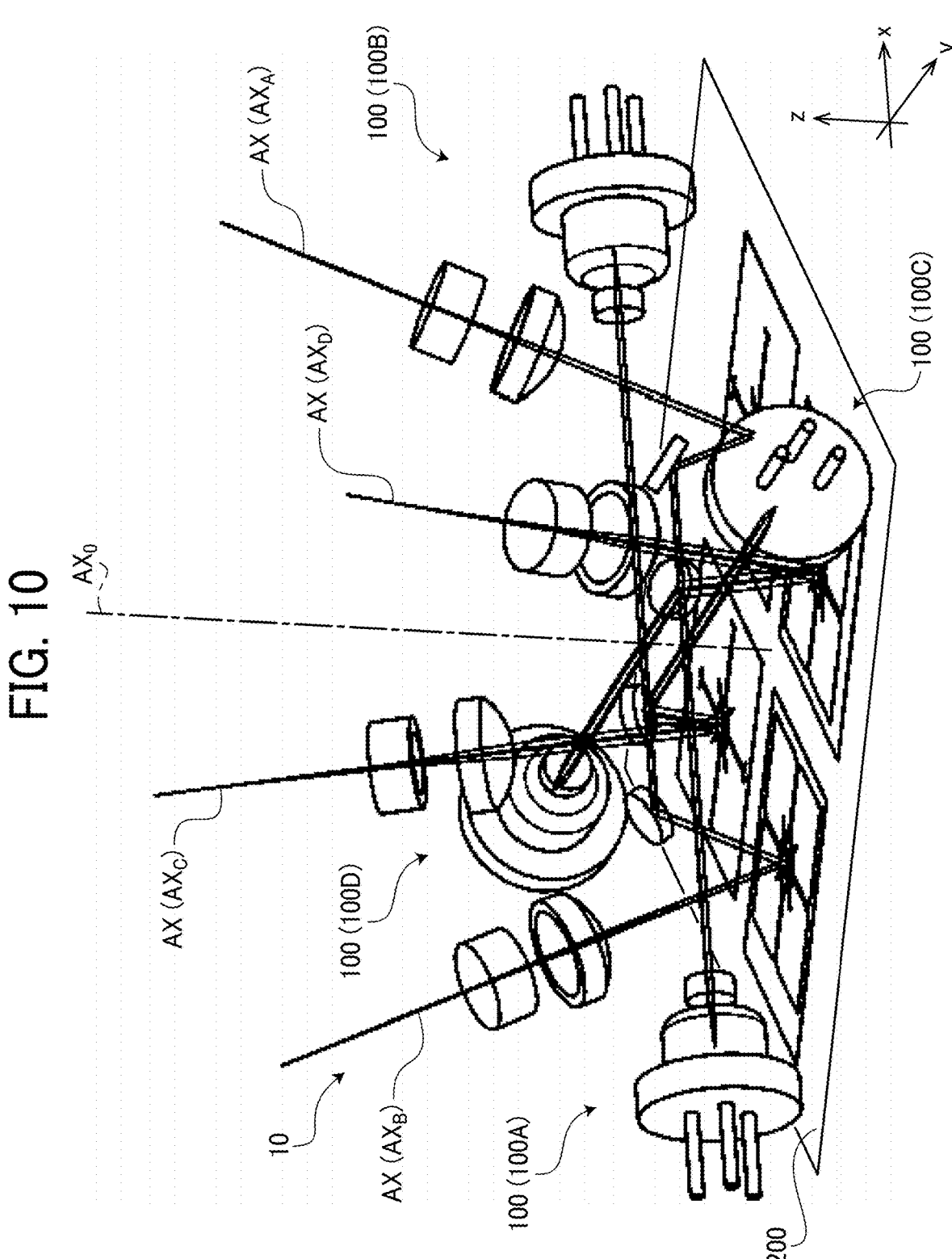
FIG. 10 is a perspective view of a projection apparatus according to a second modification of an embodiment of the present disclosure.
Figure 11:
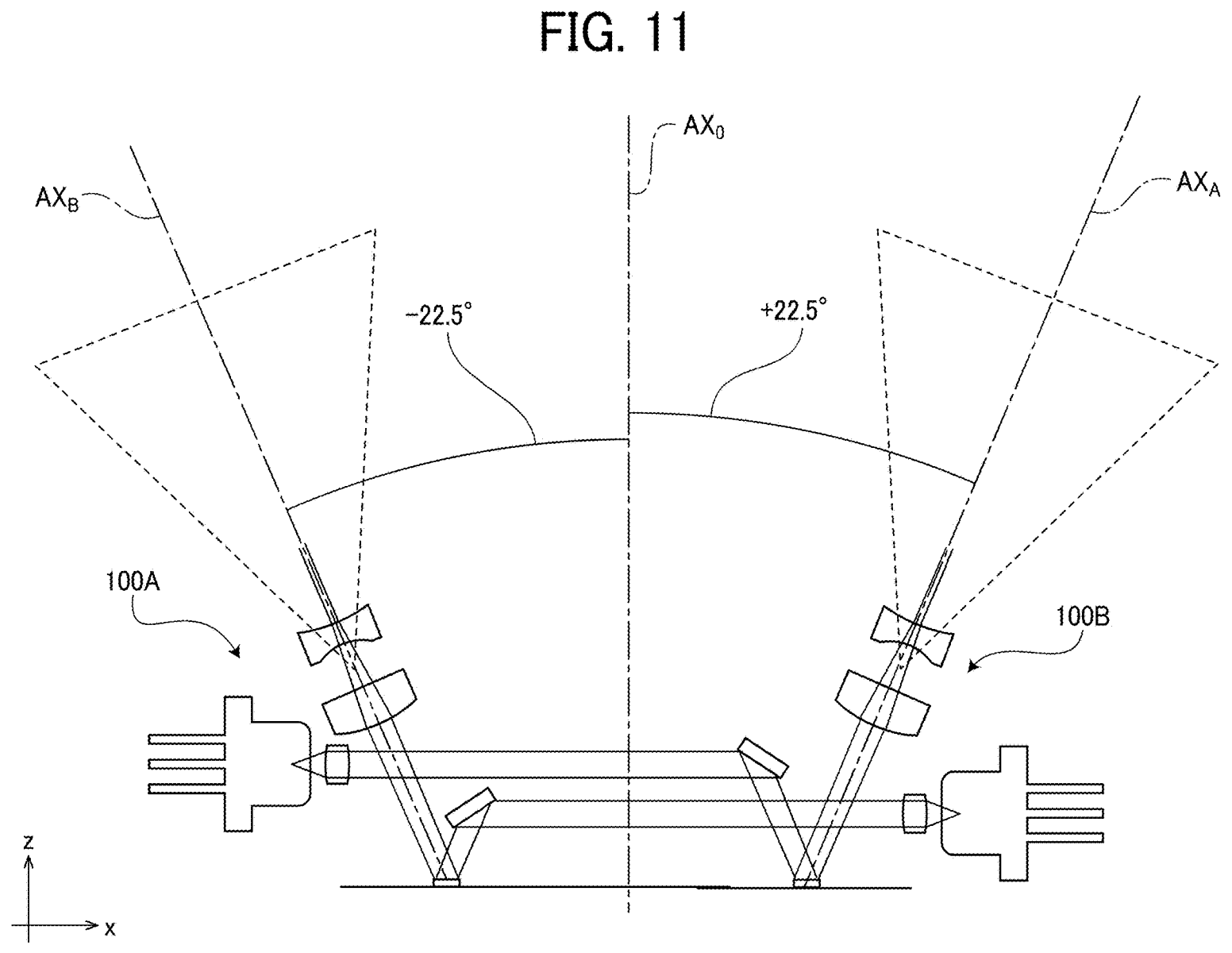

FIG. 10 is a perspective view of a projection apparatus 10 according to a second modification of the above-described embodiments of the present disclosure. FIG. 11 is a diagram illustrating an arrangement example of the scanning optical system 100 according to the second modification of the present disclosure. The scanning optical system 100 according to the second modification has the same configuration as the scanning optical system 100 according to the embodiments of the present disclosure described above (see FIGS. 2 to 7) except that the optical path is different from the optical path of the scanning optical system 100 according to the embodiments of the present disclosure described above.

As illustrated in FIGS. 10 and 11, in the second modification, the scanning optical systems 100A to 100D are rotationally symmetrically arranged around the rotationally symmetric axis $AX_0$, and the optical paths of the light beams from the light sources 110 intersect one another at the front parts of the magnifiers 140.

In at least some embodiments, the projection apparatus, further includes multiple magnifiers including the magnifier, multiple light sources including the light source. The multiple magnifiers respectively emit multiple light beams from the multiple light sources, and the multiple light beams from the multiple light sources to the multiple magnifiers intersect with each other.

Further, as illustrated in FIG. 11, the magnifier 140 of the scanning optical system 100A is arranged in a direction of +22.5 degrees with respect to the rotationally symmetric axis $AX_0$ in the x-z plane. The magnifier 140 of the scanning optical system 100B is arranged in a direction of –22.5 degrees with respect to the rotationally symmetric axis $AX_0$ in the x-z plane. Similarly, the magnifier 140 of the scanning optical system 100C is arranged in the y-z plane at an angle of –22.5 degrees with respect to the rotationally symmetric axis $AX_0$. The magnifier 140 of the scanning optical system 100D is arranged in a direction of +22.5 degrees with respect to the rotationally symmetric axis $AX_0$ in the y-z plane.

Figure 12:
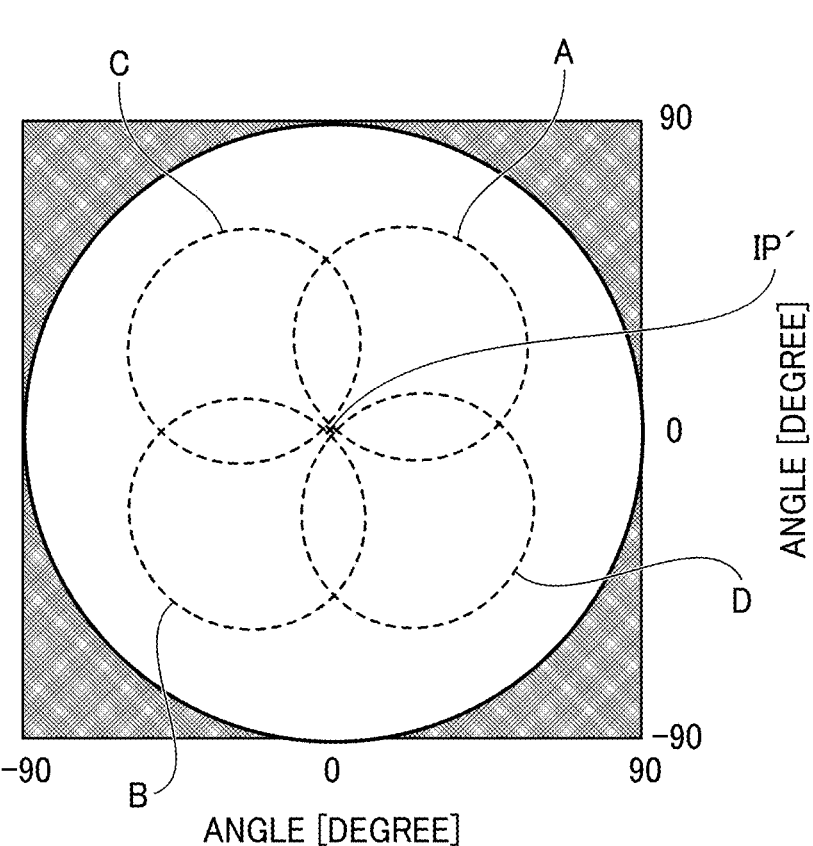
FIG. 12 is a schematic diagram illustrating the projection range of an image by a projection apparatus according to the second modification of an embodiment of the present disclosure.

FIG. 12 is a schematic diagram illustrating the projection range of an image by the projection apparatus 10 according to the second modification.

As illustrated in FIG. 12, also in the second modification, the projection apparatus 10 uses four scanning optical systems 100A to 100D to project four partial images onto regions different from each other to form one image. As a result, a wide angle of view is achieved.

In the second modification, since the scanning optical systems 100A to 100D are rotationally symmetric arranged around the rotationally symmetric axis $AX_0$ and have a configuration in which the optical paths of light beams from the light sources 110 intersect at the front parts of the magnifiers 140, an image can be projected over a wider range (FIG. 12) than in the above-described embodiments of the present disclosure described above (FIGS. 2 to 7).

Additionally, the total scanning angle (e.g., 45 degrees) of the scanning light that has passed through the magnifier 140 is assigned to an angle twice or more of the angle between the optical axis AX and the rotationally symmetric axis $AX_0$ (e.g., 22.5 degrees) so that a gap is less likely to occur between the projection ranges of the partial images by the scanning optical systems 100.

In at least some embodiments, in the projection apparatus, a total scanning angle of the scanning light beam via the magnifier has twice or more of an angle between an optical axis of the scanning optical system and the perpendicular line.

In the second modification, when one mirror 120 of one scanning optical system 100 and another mirror 120 of another scanning optical system 100, which are a pair of the scanning optical systems and arranged at opposite positions interposing the rotationally symmetric axis $AX_0$, are arranged at the same height, vignetting occurs at the mirrors 120 and a proper light beam does not enter the scanner 130. In order to avoid such vignetting, in the second modification, as illustrated in FIG. 11, in a pair of scanning optical systems 100 arranged to face each other, the light sources 110 and the mirrors 120 are arranged such that the height positions of the light source 110 and the mirror 120 are displaced between the pair of scanning optical systems 100.

In at least some embodiments, in the projection apparatus, a scanning optical system pair, includes a pair of the scanning optical system disposed across the perpendicular line, the pair of the scanning optical system includes a pair of mirrors to bend the light beam from the light source toward the scanner in an optical path between the light source and the scanner, and the pair of mirrors are arranged at a height different from each other from the mounting surface of the board.

By displacing the height positions of the light source 110 and the mirror 120, elements of the scanning optical system 100 can be disposed in a reduced space as compared with the embodiments of the present disclosure described above (see FIGS. 2 to 7). Thus, the projection apparatus 10 can be further reduced in size.

Figure 13:
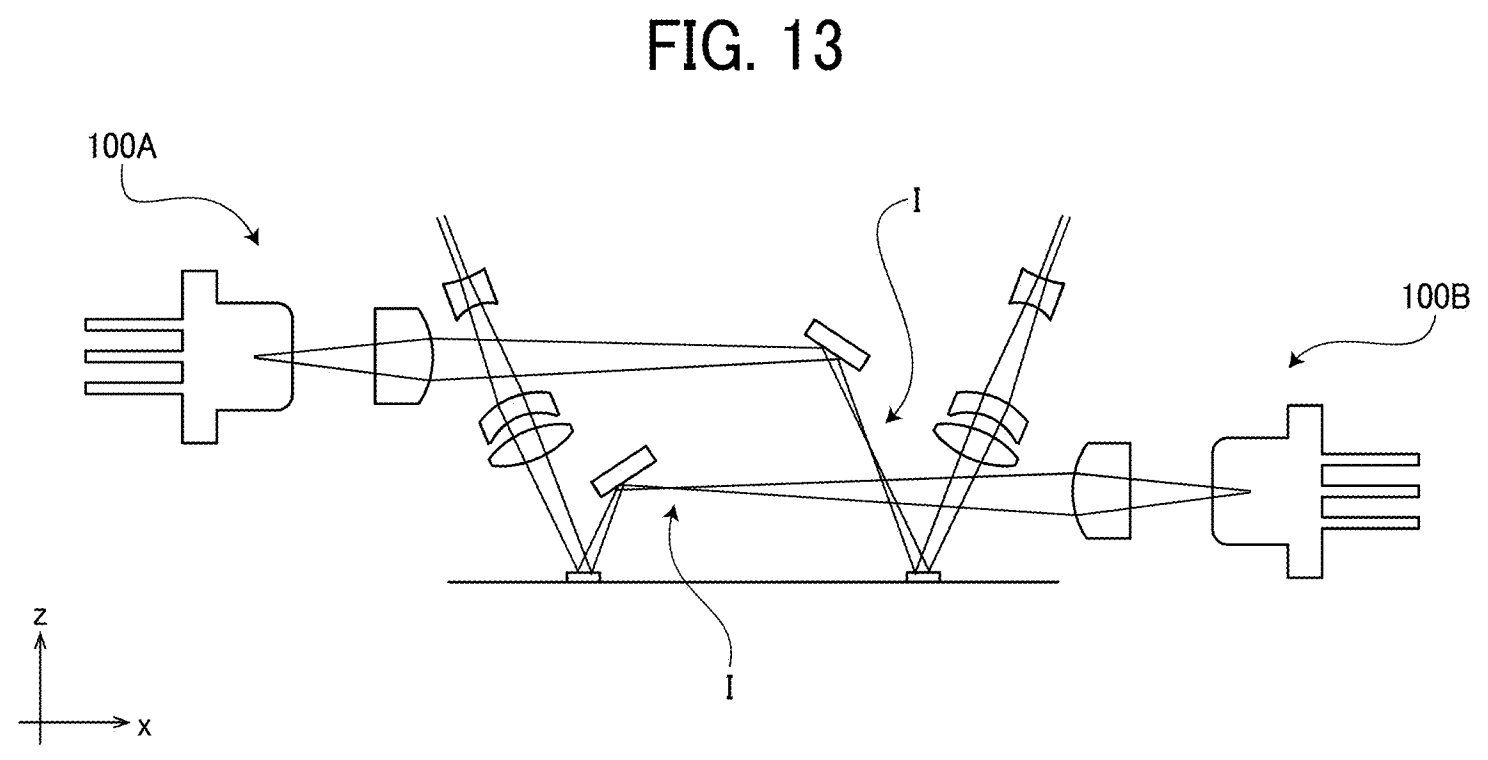

FIG. 13 is a perspective view of a projection apparatus 10 according to a third modification of the above-described embodiments of the present disclosure. The scanning optical system 100 according to the third modification has the same configuration as the scanning optical system 100 according to the second modification except that the intermediate image I is formed on the optical path.

By adopting the configuration in which the intermediate image I is formed on the optical path between the light source 110 and the scanner 130, the position adjustment of the collimator lens 114 can be further facilitated as compared with the second modification.

Figure 14A:
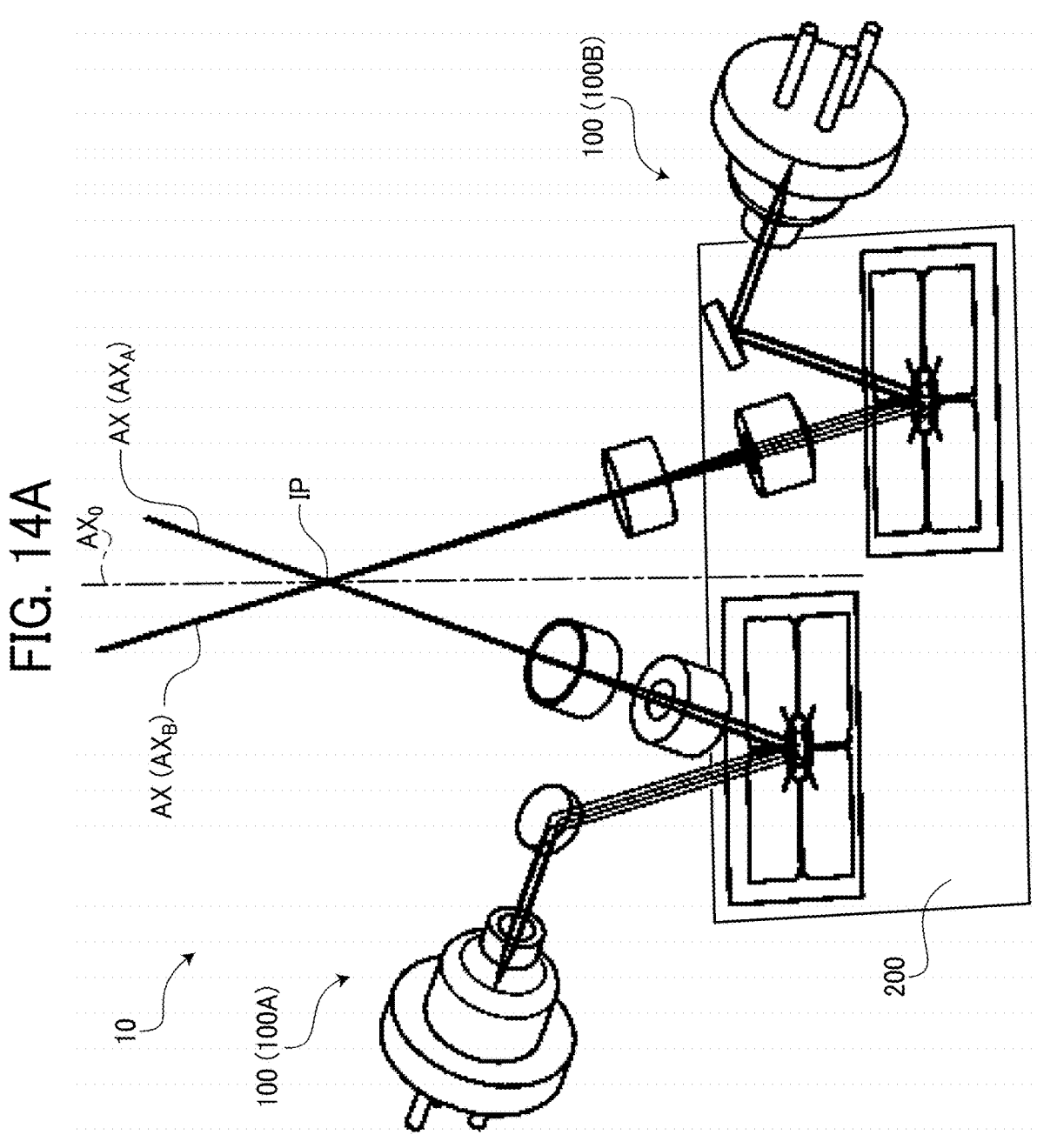
FIG. 14A is a perspective view of a projection apparatus according to a fourth modification of an embodiment of the present disclosure.
Figure 14B:
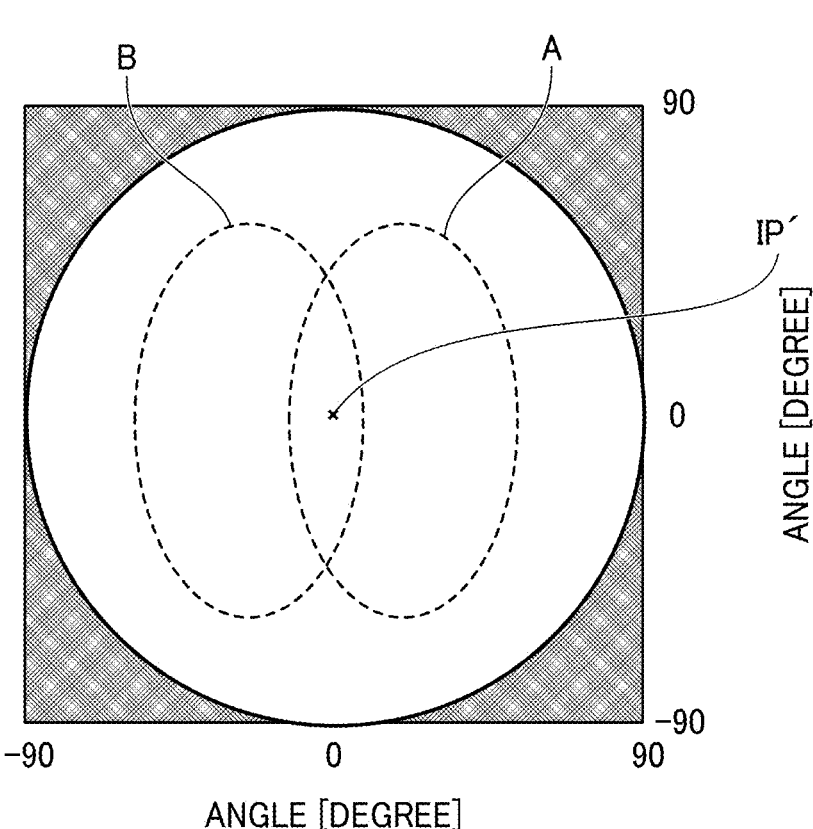
FIG. 14B is a schematic diagram illustrating a projection range of an image by a projection apparatus according to a fourth modification of an embodiment of the present disclosure.

The number of the scanning optical system 100 is not limited to four. FIG. 14A is a perspective view of a projection apparatus 10 according to a fourth modification of the above-described embodiments of the present disclosure. FIG. 14B is the schematic diagram illustrating the projection range of an image by the projection apparatus according to the fourth modification of the present disclosure.

As illustrated in FIG. 14A, the projection apparatus 10 according to the fourth modification includes a pair of the scanning optical systems 100A and 100B arranged to face each other with the rotationally symmetric axis $AX_0$ interposed between the pair of scanning optical systems 100. In the fourth modification, as illustrated in FIG. 14B, the projection apparatus 10 uses a pair of scanning optical systems 100A and 100B to project two partial images forming one image onto regions different from each other. As a result, a wide angle of view is achieved.

In order to achieve a projection range of 70 degrees at a full angle for the projection apparatus 10, each of the scanning optical systems 100 can project an image in a range of approximately 40 degrees at a full angle horizontally and approximately 90 degrees at a full angle vertically. Thus, in the fourth modification, the magnifying power of the magnifier 140 is assigned to a value larger than that in the configuration including four scanning optical systems 100.

Figure 15A:
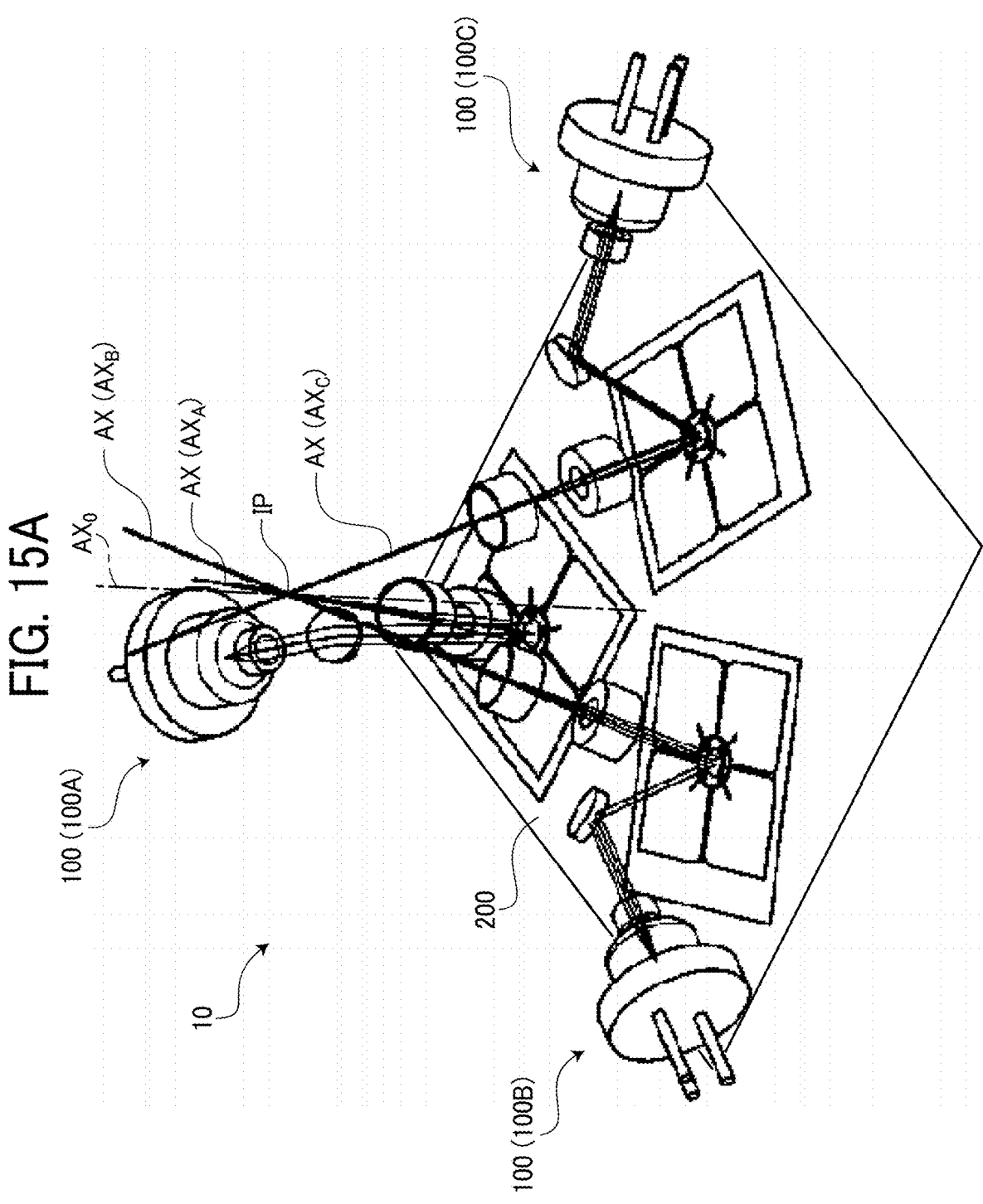
FIG. 15A is a perspective view of a projection apparatus according to a fifth modification of an embodiment of the present disclosure.
Figure 15B:
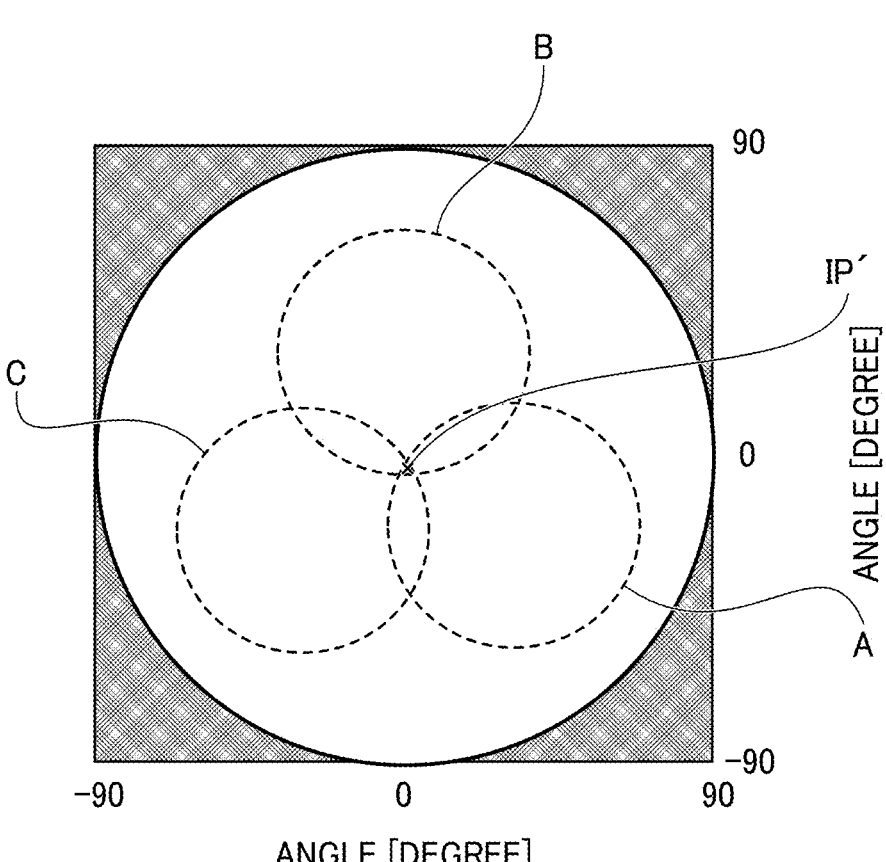
FIG. 15B is a schematic diagram illustrating a projection range of an image by a projection apparatus according to a fifth modification of an embodiment of the present disclosure.

FIG. 15A is a perspective view of a projection apparatus 10 according to a fifth modification of the above-described embodiments of the present disclosure. FIG. 15B is the schematic diagram illustrating the projection range of an image by a projection apparatus according to the fifth modification of the present disclosure.

As illustrated in FIG. 15A, the projection apparatus 10 according to the fifth modification includes the three scanning optical systems 100A to 100C rotationally symmetrically arranged around the rotationally symmetric axis $AX_0$ at 120-degree intervals. In the fifth modification, as illustrated in FIG. 15B, the projection apparatus 10 uses the three scanning optical systems 100A to 100C to project three partial images to from one image onto regions different from each other. As a result, a wide angle of view is achieved.

In order to achieve a projection range of 70 degrees at a full angle for the projection apparatus 10, each of the scanning optical systems 100 can project an image in a range of approximately 60 degrees at a full angle horizontally and approximately 60 degrees at a full angle vertically. Thus, in the fifth modification, the magnifying power of the magnifier 140 is assigned to a value larger than that in the configuration including four scanning optical systems 100.

The number of the scanning optical system 100 is not limited to four. The number of the scanning optical system 100 may be five or more.

The above is a description of exemplary embodiments of the present disclosure. The embodiments of the present disclosure are not limited to those described above, and various modifications are possible within the scope of the technical idea of the present disclosure. For example, the embodiments of the present disclosure also include contents obtained by appropriately combining the embodiments of the present disclosure explicitly described in the specification or the obvious embodiments.

For example, in FIG. 2, in the optical axes $AX_A$ to $AX_D$, the scanning optical systems 100A to 100D intersect on the rotationally symmetric axis $AX_0$, but the configuration of the present disclosure is not limited thereto. As an example, the optical axes $AX_A$ to $AX_D$ may intersect at a position in the vicinity of the rotational symmetrical axis $AX_0$ (a position displaced from the rotationally symmetric axis $AX_0$). The amount of displacement between the rotationally symmetric axis $AX_0$ and the intersection point IP may be acceptable as long as the amount of displacement does not affect the projection.

Aspects of the present disclosure are as follows.

In a first aspect, a projection apparatus includes: multiple scanning optical systems each including: a light source to emit a light beam; a scanner to deflect the light beam from the light source to form a scanning light beam; a magnifier including: at least one positive lens; and at least one negative lens, to magnify a scanning angle of the scanning light beam from the scanner; and a board having: a mounting surface; and a perpendicular line perpendicular to the mounting surface, the board mounting multiple scanners including the scanner of the multiple scanning optical systems on the mounting surface. Multiple scanning light beams have the scanning light beam from the scanner are arranged in rotational symmetry with respect to the perpendicular line with different angles in a plane of the mounting surface of the board, and the multiple scanning optical systems project the multiple scanning light beams to different regions from each other.

In a second aspect, the projection apparatus according to the first aspect, further includes multiple magnifiers including the magnifier, and the multiple magnifiers respectively have multiple optical axes each intersecting the perpendicular line.

In a third aspect, the projection apparatus according to the first aspect, further includes multiple magnifiers including the magnifier, multiple light sources including the light source. The multiple magnifiers respectively emit multiple light beams from the multiple light sources, and the multiple light beams from the multiple light sources to the multiple magnifiers intersect with each other.

In a fourth aspect, in the projection apparatus according to any one of the first aspect to the third aspect, the light beam incident on the scanner from the light source includes a parallel light beam or a converging light beam.

In a fifth aspect, in the projection apparatus according to any one of the first aspect to the fourth, the scanning optical system includes an intermediate image former in an optical path between the light source and the scanner to form an intermediate image.

In a sixth aspect, in the projection apparatus according to any one of the first aspect to the fifth aspect, the scanning optical system includes: a mirror in an optical path between the light source and the scanner; and a lens adjacent to the scanner in the magnifier. The mirror bends the light beam from the light source toward the scanner, and the mirror is farther from the scanner than the lens in a direction extending the perpendicular line.

In a seventh aspect, in the projection apparatus according to any one of the first aspect to the fifth aspect, a scanning optical system pair including a pair of scanning optical systems including the scanning optical system disposed across the perpendicular line. The pair of the scanning optical systems include a pair of mirrors to bend the light beam from the light source toward the scanner in an optical path between the light source and the scanner, and the pair of mirrors are arranged at a height different from each other from the mounting surface of the board.

In an eighth aspect, in the projection apparatus according to any one of the first aspect to the seventh aspect, a total scanning angle of the scanning light beam via the magnifier has twice or more of an angle between an optical axis of the scanning optical system and the perpendicular line.

In a ninth aspect, in the projection apparatus according to the first aspect to the eighth aspect, the multiple scanning optical systems are arranged around the perpendicular line at an equal interval.

In a tenth aspect, in the projection apparatus according to any one of the first aspect to the ninth aspect, the multiple scanning optical systems respectively include multiple magnifiers including the magnifier, and the multiple scanning optical system are disposed rotational symmetry with respect to the perpendicular line.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A projection apparatus comprising:
   multiple scanning optical systems each including:
   a light source to emit a light beam;
   a scanner to deflect the light beam from the light source to form a scanning light beam;
   a magnifier including:
   at least one positive lens; and
   at least one negative lens,
   to magnify a scanning angle of the scanning light beam from the scanner; and a board having:
  a mounting surface; and
  a perpendicular line perpendicular to the mounting
    surface,
    the board mounting multiple scanners including the
      scanner of the multiple scanning optical systems on
      the mounting surface,
  wherein multiple scanning light beams having the scan-
    ning light beam from the scanner are arranged in
    rotational symmetry with respect to the perpendicular
    line with different angles in a plane of the mounting
    surface of the board, and
  the multiple scanning optical systems project the multiple
    scanning light beams to different regions from each
    other.

2. The projection apparatus according to claim 1, further
comprising:
  multiple magnifiers including the magnifier,
  wherein the multiple magnifiers respectively have mul-
    tiple optical axes each intersecting the perpendicular
    line.

3. The projection apparatus according to claim 1, further
comprising:
  multiple magnifiers including the magnifier,
  multiple light sources including the light source,
  wherein the multiple magnifiers respectively emit mul-
    tiple light beams from the multiple light sources, and
  the multiple light beams from the multiple light sources to
    the multiple magnifiers intersect with each other.

4. The projection apparatus according to claim 1, wherein:
  the light beam incident on the scanner from the light
    source includes a parallel light beam or a converging
    light beam.

5. The projection apparatus according to claim 1, wherein;
  the scanning optical system includes an intermediate
    image former in an optical path between the light
    source and the scanner to form an intermediate image.

6. The projection apparatus according to claim 1, wherein
the scanning optical system includes:
  a mirror in an optical path between the light source and
    the scanner; and
  a lens adjacent to the scanner in the magnifier, and
  wherein:
  the mirror bends the light beam from the light source
    toward the scanner, and
  the mirror is farther from the scanner than the lens in a
    direction extending the perpendicular line.

7. The projection apparatus according to claim 1, further
comprising:
  a scanning optical system pair including a pair of scan-
    ning optical systems including the scanning optical
    system disposed across the perpendicular line,
  wherein the pair of the scanning optical systems include
    a pair of mirrors to bend the light beam from the light
    source toward the scanner in an optical path between
    the light source and the scanner, and
  the pair of mirrors are arranged at a height different from
    each other from the mounting surface of the board.

8. The projection apparatus according to claim 1, wherein;
  a total scanning angle of the scanning light beam via the
    magnifier has twice or more of an angle between an
    optical axis of the scanning optical system and the
    perpendicular line.

9. The projection apparatus according to claim 1, wherein;
  the multiple scanning optical systems are arranged around
    the perpendicular line at an equal interval.

10. The projection apparatus according to claim 1,
wherein;
  the multiple scanning optical systems respectively include
    multiple magnifiers including the magnifier, and
  the multiple scanning optical systems are disposed in
    rotational symmetry with respect to the perpendicular
    line.

11. The projection apparatus according to claim 1,
wherein:
  the multiple scanners are on and disposed around the
    perpendicular line, and
  the multiple scanning optical systems project the multiple
    scanning light beams to different regions from each
    other to form one image.

12. The projection apparatus according to claim 11,
wherein:
  the one image is projected onto an area above a stable
    visual field of an observer.

13. The projection apparatus according to claim 11,
wherein:
  an optical axis of each of the multiple scanning optical
    systems intersects the perpendicular line at a single
    intersection point.

14. The projection apparatus according to claim 11,
wherein:
  the multiple scanning optical systems are arranged at an
    equal distance from an intersection point where optical
    axes of the scanners intersect.

15. The projection apparatus according to claim 1,
wherein:
  each scanner is a micro-electro-mechanical systems
    (MEMS) mirror.

16. The projection apparatus according to claim 1,
wherein:
  the light source includes a semiconductor laser and a
    collimator lens.

17. The projection apparatus according to claim 11,
wherein:
  the one image includes at least one calling attention image
    projected onto an inattention area.

18. The projection apparatus according to claim 1,
wherein:
  the board is a single control board on which a micropro-
    cessor unit is mounted to control the multiple scanners.

19. The projection apparatus according to claim 1,
wherein:
  the scanner is configured to perform vector scanning.

20. The projection apparatus according to claim 1, further
comprising:
  a battery to power the light source and the scanner.

* * * * *